(12) United States Patent
Morgans et al.

(10) Patent No.: US 11,352,072 B1
(45) Date of Patent: Jun. 7, 2022

(54) REAR SILL ASSEMBLY OF A UNIBODY PICKUP TRUCK

(71) Applicant: Ford Global Technologies, LLC, Dearborn, MI (US)

(72) Inventors: Shawn Michael Morgans, Chelsea, MI (US); Stephen William Gallagher, Bloomfield Hills, MI (US); Scott Seashore, Dearborn, MI (US); Musheeruddin Zubair Syed, Farmington Hills, MI (US); Karen Nuler, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/146,096

(22) Filed: Jan. 11, 2021

(51) Int. Cl.
| | | |
|---|---|---|
| B62D 33/077 | (2006.01) | |
| B62D 23/00 | (2006.01) | |
| B62D 25/20 | (2006.01) | |
| B62D 25/04 | (2006.01) | |
| B62D 29/00 | (2006.01) | |
| B62D 27/02 | (2006.01) | |

(52) U.S. Cl.
CPC ......... B62D 33/077 (2013.01); B62D 23/005 (2013.01); B62D 25/04 (2013.01); B62D 25/2054 (2013.01); B62D 27/023 (2013.01); B62D 29/00 (2013.01)

(58) Field of Classification Search
CPC .......................... B62D 25/08; B62D 25/2054; B62D 25/2027; B62D 25/2036; B62D 27/023; B62D 27/06; B62D 33/02; B62D 33/077
USPC ..... 296/183.1, 184.1, 186.3, 193.03, 193.04, 296/193.08
See application file for complete search history.

(56) References Cited

U.S. PATENT DOCUMENTS

| | | | | |
|---|---|---|---|---|
| 2,729,499 A | * | 1/1956 | Eggum | B62D 33/08 296/26.09 |
| 3,588,160 A | * | 6/1971 | Reiner | B60D 1/54 293/119 |
| 6,302,478 B1 | | 10/2001 | Jaekel et al. | |
| 6,601,895 B1 | * | 8/2003 | Tannenbaum | B60P 1/6481 296/26.09 |
| 6,824,204 B2 | | 11/2004 | Gabbianelli et al. | |
| 9,139,235 B2 | | 9/2015 | Craig et al. | |
| 9,145,176 B1 | | 9/2015 | Van Wyk et al. | |

* cited by examiner

*Primary Examiner* — Dennis H Pedder
(74) *Attorney, Agent, or Firm* — Vichit Chea; Carlson, Gaskey & Olds, P.C.

(57) ABSTRACT

The present disclosure generally relates to a rear sill assembly of a unibody vehicle. The unibody vehicle includes a floor assembly having a floor pan and a floor beam coupled to the floor pan, the floor beam having a floor channel. The unibody vehicle also includes a rear sill, and a coupling structure coupled to the rear sill. The coupling structure may include an outer periphery which is sized and shaped to be slideably coupleably received in the floor channel.

20 Claims, 8 Drawing Sheets

US 11,352,072 B1

REAR SILL ASSEMBLY OF A UNIBODY PICKUP TRUCK

BACKGROUND

Technical Field

The present disclosure generally relates to a rear sill assembly of a unibody vehicle.

Description of the Related Art

Unibody vehicles are generally light in weight and do not include a conventional frame, which typically, coupleably receives various vehicle structures. It may be desirable to efficiently couple various vehicle structures to a unibody vehicle.

BRIEF SUMMARY

The present disclosure relates to a rear sill assembly that slideably couples to a floor assembly of a unibody pickup truck, which may improve coupling efficiencies.

For example, in one example embodiment, a unibody truck includes a floor assembly having a floor pan and a floor beam coupled to the floor pan, the floor beam having a floor channel, a rear sill, and a coupling structure coupled to the rear sill. The coupling structure may include an outer periphery which is sized and shaped to be slideably coupleably received in the floor channel.

In another example embodiment, a vehicle includes a floor assembly, a first coupling structure and a second coupling structure. The floor assembly further includes a floor pan, a first floor beam, and a second floor beam. The first floor beam is coupled to the floor beam and includes a first floor channel. The second floor beam is also coupled to the floor beam and includes a second floor channel. The first coupling structure is slideably coupleably received in the first floor channel, and the second coupling structure is slideably coupleably received in the second floor channel.

In another example embodiment, a rear sill assembly includes a first beam portion, a second beam portion, a first coupling structure, and a second coupling structure. The first and second beam portions are spaced apart to form a first sill channel and a second sill channel. The first and second coupling structures are received into the first sill channel and the second sill channel, respectively. Further, the first and the second coupling structures slideably couple the rear sill assembly with a floor assembly.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with vehicles have not been shown or described in detail to avoid unnecessarily obscuring descriptions of the embodiments.

Figure 1:
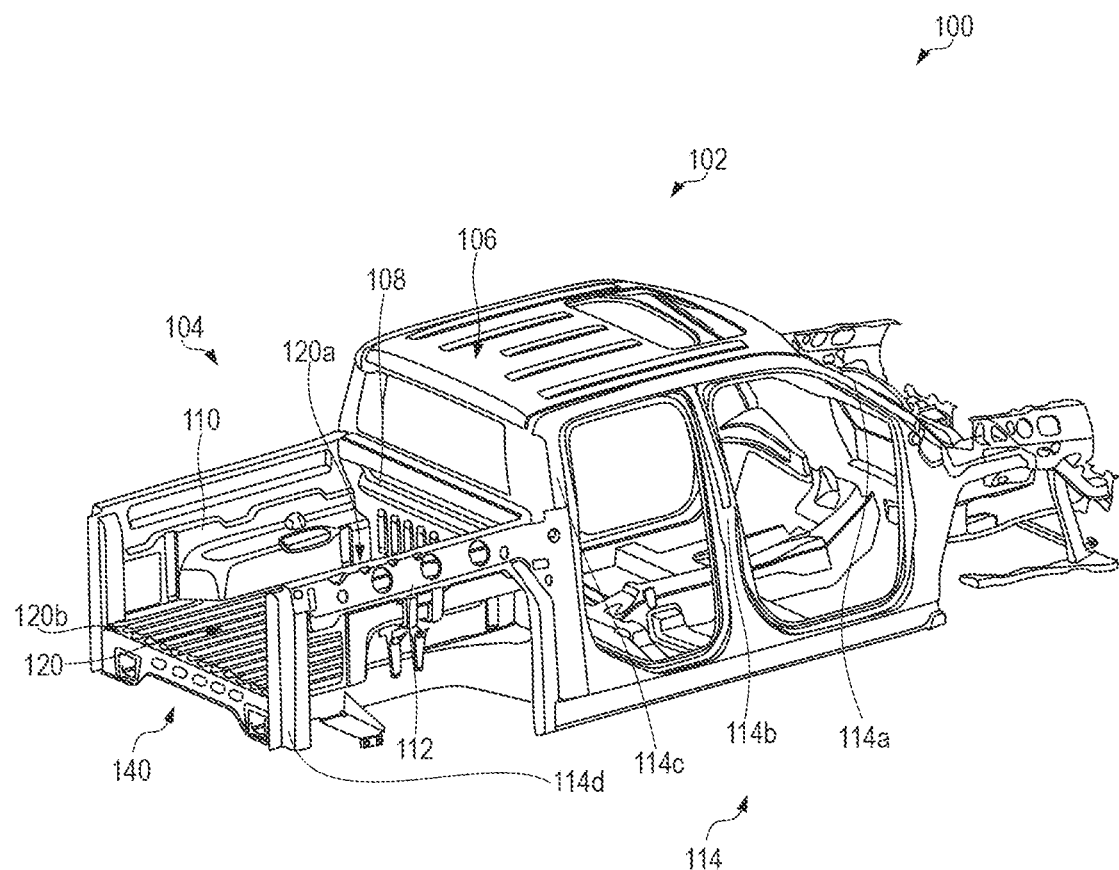
FIG. 1 is a perspective view of a pickup truck, according to an embodiment of the present disclosure.

FIG. 1 illustrates an example embodiment of a vehicle 100 that includes a cabin 102 and a truck box 104 that are integrally formed as a single unit, hereinafter referred to as a unibody 106. The vehicle 100 may be, for example, a pickup truck comprising an aluminum unibody 106. In alternative embodiments, however, the unibody 106 may comprise other materials, such as titanium, steel, and composites. As shown in FIG. 1, the unibody 106 can include various vehicle components such as body components, floorboards, door frames, pillars, roof, etc.

The truck box 104 includes a floor assembly 120 having a forward end 120a adjacent to the cabin 102 and a rear end 120b opposite the forward end 120a. The floor assembly 120 supports a header 108 at the forward end 120a and a rear sill assembly 140 at the rear end 120b. The rear sill assembly 140 may be coupled to the floor assembly 120 using fasteners, welding, or any other suitable coupling structures. The floor assembly 120 also supports a left side panel 110 and a right side panel 112 that extend between the header 108 and the rear sill assembly 140.

The vehicle 100 includes a plurality of vehicle pillar regions 114 such as an A-pillar region 114a, a B-pillar region 114b, a C-pillar region 114c, and a D-pillar region 114d. As shown in FIG. 1, the rear sill assembly 140 may include the D-pillar region 114d. In some embodiments, the illustrated vehicle 100 can take the form of a four-door configuration as illustrated in FIG. 1; however, alternatively, the vehicle 100 may comprise other configurations, such as a two-door configuration.

Figure 2:
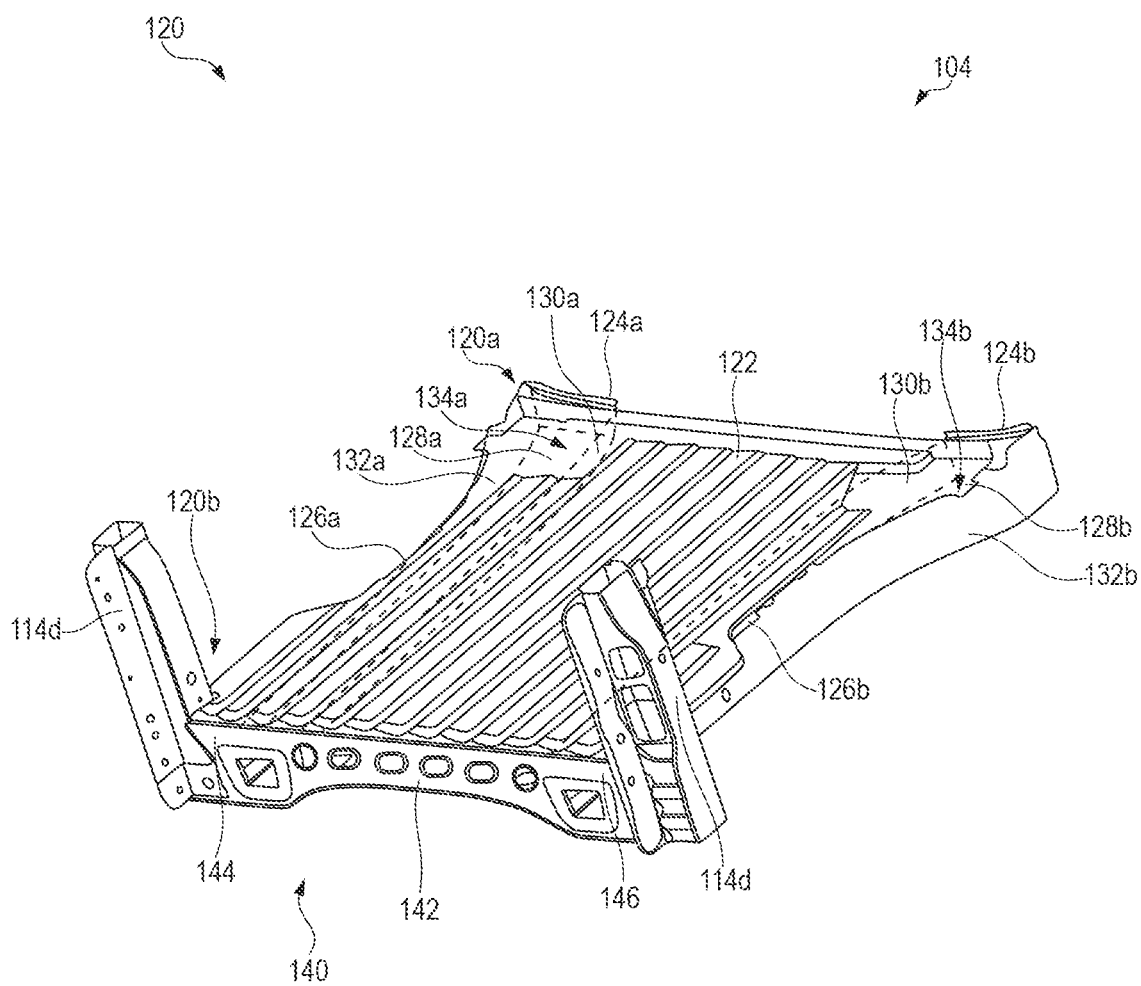
FIG. 2 is a perspective view of a portion of the pickup truck of FIG. 1, illustrating a rear sill assembly coupled with a floor assembly.

FIG. 2 illustrates portions of the truck box 104, in particular, the rear sill assembly 140 coupled with the floor assembly 120. The floor assembly 120 includes a floor pan 122 and a pair of floor beams 124a, 124b. The floor pan 122 may form a cargo bed of the truck box 104. Each of the floor beams 124a, 124b includes a generally rectangular hollow tubular structure that extends between the rear end 120b and the forward end 120a of the floor assembly 120. As the floor beams 124a, 124b extend from the rear end 120b to the forward end 120a, the floor beams 124a, 124b taper outwardly forming an arcuate shape.

The floor beams 124a, 124b are generally similar to each other, and in particular, are mirror images of each other. The floor beams 124a, 124b are positioned under the floor pan 122 and are coupled to the floor pan 122. In particular, each floor beam 124a, 124b includes rim portions 126a, 126b that mate with the floor pan 122. In general, the floor beams 124a, 124b may act as the load bearing structure of the truck box 104 and provide support to the floor pan 122.

As described above and shown in more detail in FIGS. 7 and 8, each of the floor beams 124a, 124b forms a hollow tubular structure. In particular, each of the floor beams 124a, 124b includes a first flange 128a, 128b, a second flange 130a, 130b, and a third flange 132a, 132b, respectively. The second flanges 130a, 130b and the third flanges 132a, 132b extend outwardly from the first flanges 128a, 128b to define floor channels 134a, 134b. The floor channels 134a, 134b are sized, shaped, and arranged to slideably coupleably receive the rear sill assembly 140 as described in more detail below.

The rear sill assembly 140 includes a rear sill 142 and the D-pillar regions 114d. Each of the D-pillar regions 144d is generally similar to each other, e.g., each D-pillar region 144d may be a mirror image of the other D-pillar region 144d. The rear sill 142 includes a proximal end 144 and a distal end 146, opposite to the proximal end 144. The D-pillar regions 114d are coupled at the proximal end 144 and the distal end 146 of the rear sill 142. The rear sill 142 and the D-pillar regions 114d may be manufactured together as a single unit using casting or stamping, for example. Optionally, the rear sill 142 and the D-pillar regions 114d may be manufactured separately and later coupled using fasteners, spot welding, or other coupling structures.

Figure 3:
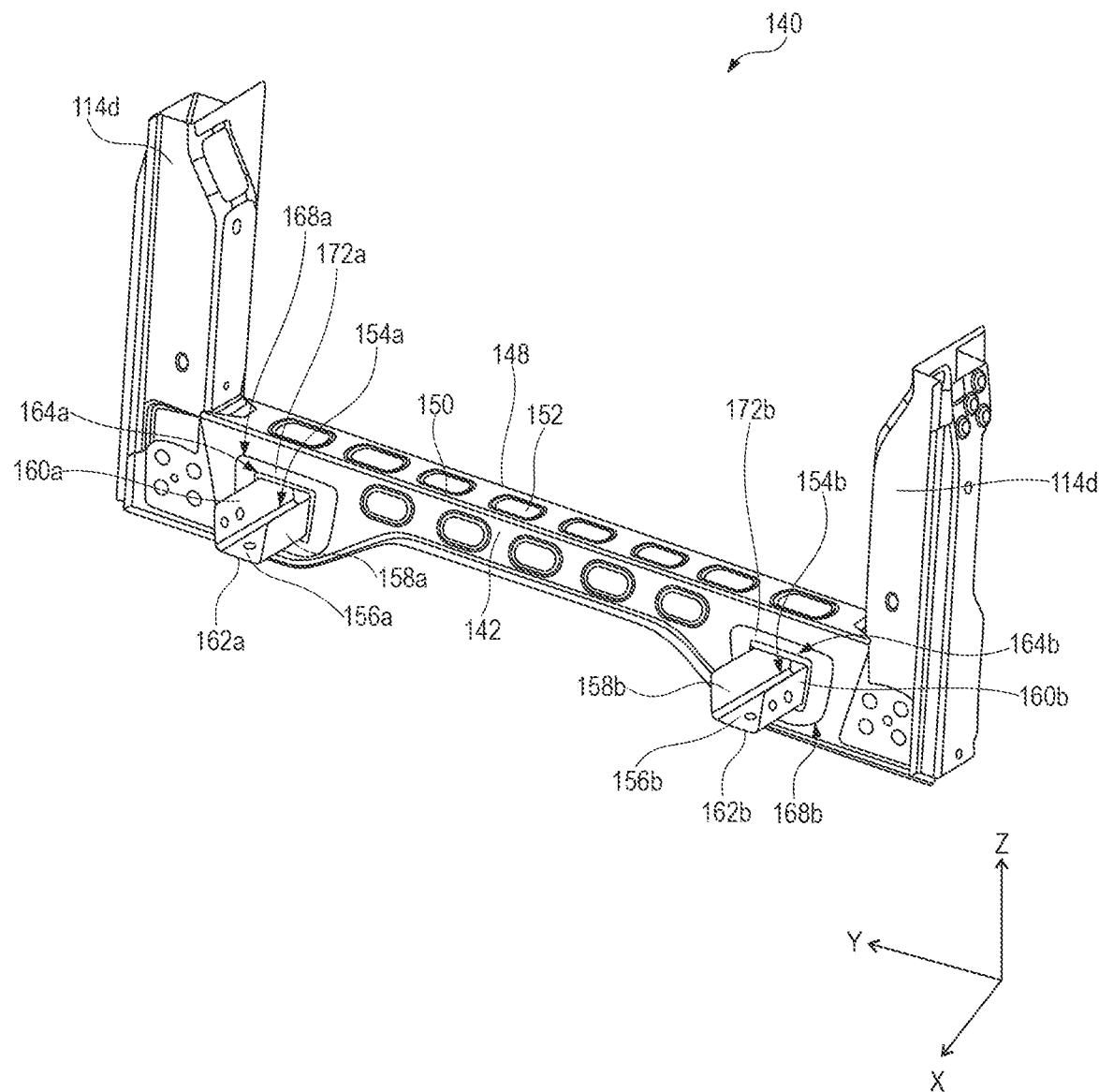
FIG. 3 is a perspective front view of the rear sill assembly of FIG. 2.
Figure 4:
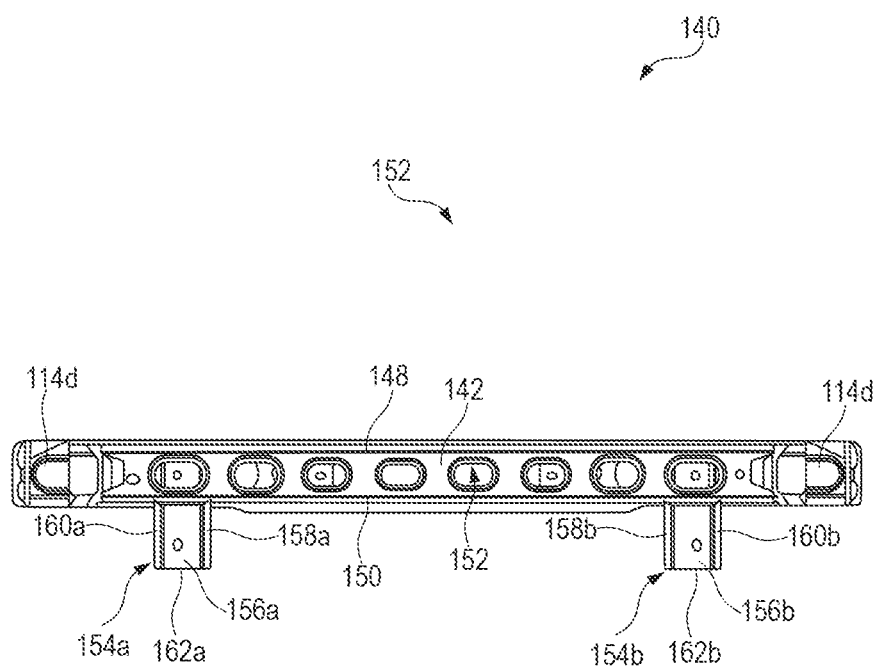
FIG. 4 is a top view of the rear sill assembly of FIG. 3.
Figure 5:
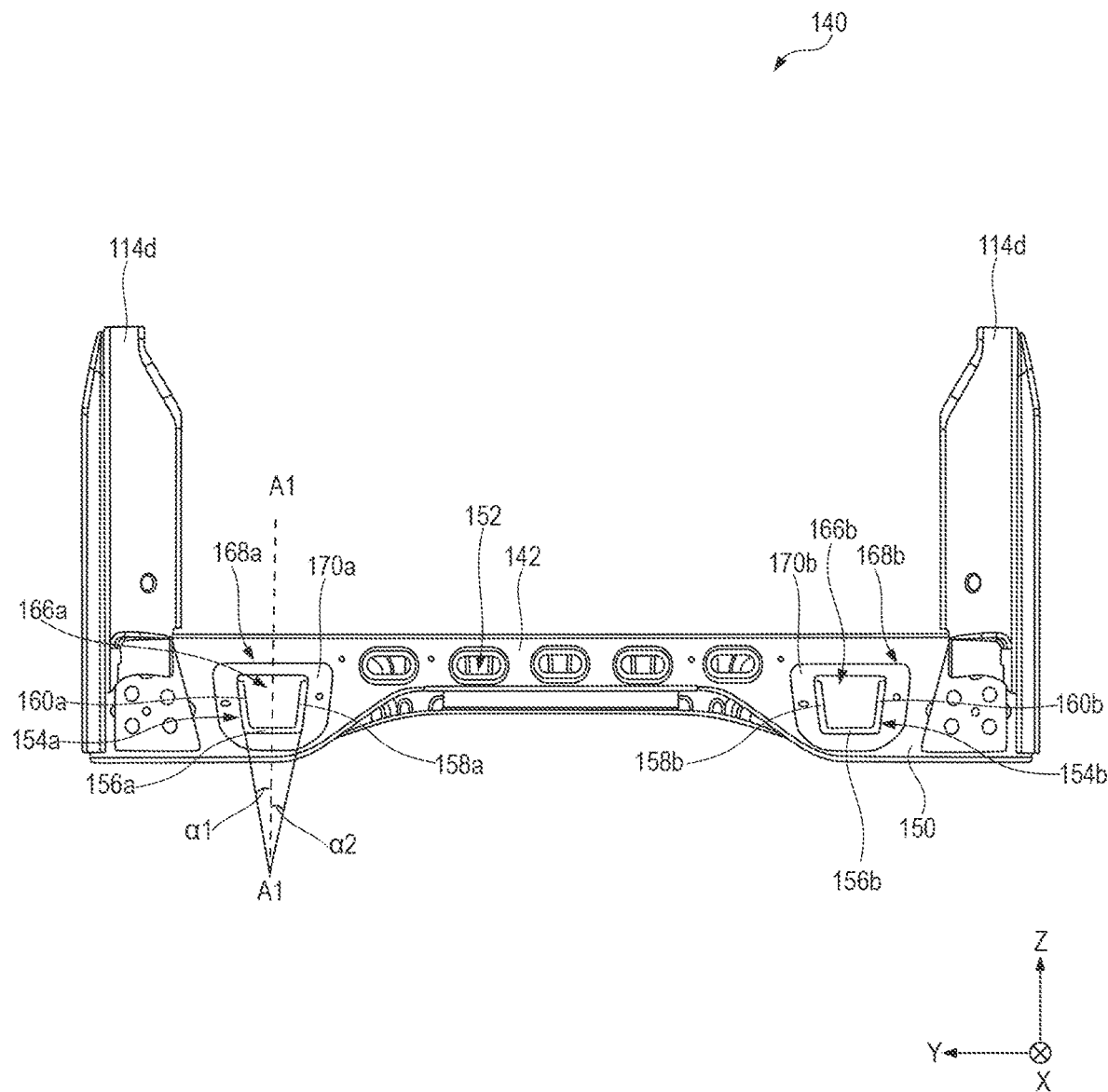
FIG. 5 is a rear view of the rear sill assembly of FIG. 3.
Figure 6:
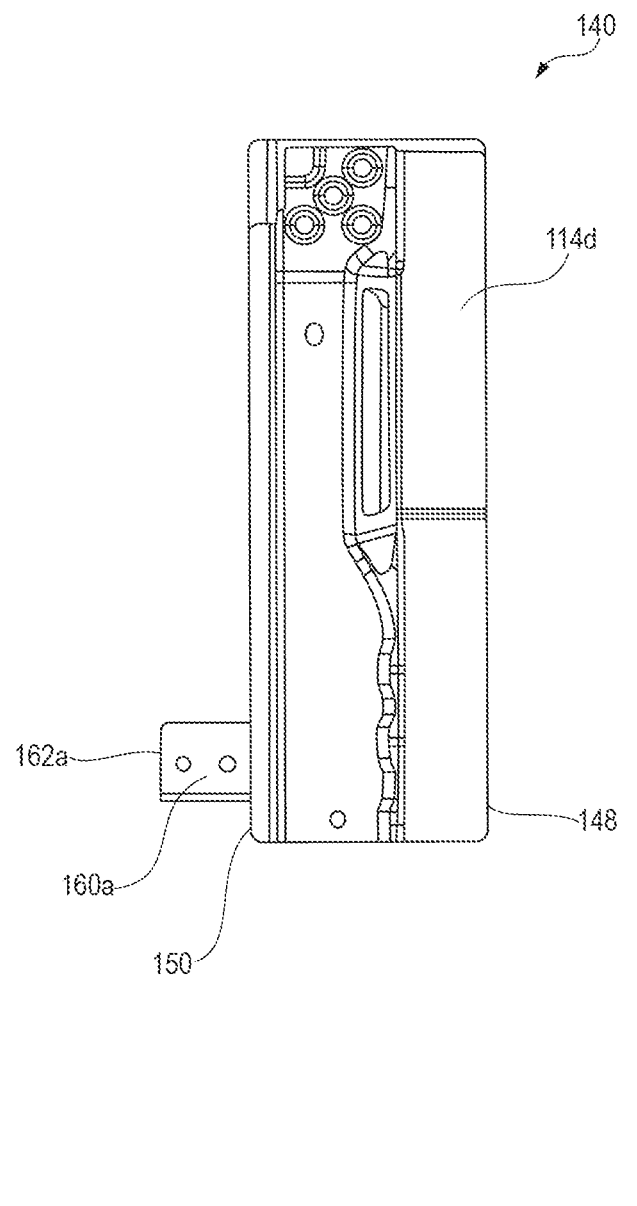
FIG. 6 is a side view of the rear sill assembly of FIG. 3.
Figure 6:
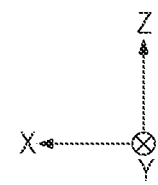

FIGS. 3-6 illustrate various views of the rear sill assembly 140. In particular, FIG. 3 is a perspective front view of the rear sill assembly 140. FIG. 4 is a top view of the rear sill assembly 140 of FIG. 3. FIG. 5 is a rear view of the rear sill assembly 140 of FIG. 3. FIG. 6 is a side view of the rear sill assembly 140 of FIG. 3.

The rear sill 142 includes a first beam portion 148 and a second beam portion 150. The second beam portion 150 is longitudinally spaced apart from the first beam portion 148 and defines a sill channel 152 in between. The sill channel 152 is a cavity formed between the first beam portion 148 and the second beam portion 150. The channel 152 receives a pair of coupling structures 154a, 154b, which extend though the sill channel 152.

The coupling structures 154a, 154b are generally similar to each other. In particular, the coupling structures 154a, 154b are mirror images of each other. When the coupling structures 154a, 154b are received in the sill channel 152, the coupling structures 154a, 154b extend outwardly beyond the second beam portion 150.

As shown in detail in FIGS. 3 and 5, each of the coupling structures 154a, 154b includes a base flange 156a, 156b, a first side flange 158a, 158b, and a second side flange 160a, 160b. The base flanges 156a, 156b, the first side flanges 158a, 158b, and the second side flanges 160a, 160b, define corresponding outer peripheries 162a, 162b of the coupling structures 154a, 154b.

As shown in more detail in FIGS. 3 and 5, the base flanges 156a, 156b extend perpendicularly to the rear sill 142 along an X axis. The first side flanges 158a, 158b and the second side flanges 160a, 160b extend outwardly from ends of the base flanges 156a, 156b. In particular, the first side flanges 158a, 158b and the second side flanges 160a, 160b extend angularly with respect to a central axis A1-A1 at angles α1 and α2 (shown only with respect to first coupling structure 154a for the sake of clarity of illustration and description). In particular, the angular orientation of the first side flanges 158a, 158b and the second side flanges 160a, 160b provide a substantially trapezoidal shape to the coupling structures 154a, 154b. Although FIGS. 3-6 illustrate a substantially trapezoidal shape, alternatively, the first and second coupling structures 154a, 154b may take other forms and shapes, such as rectangular, square, triangular, or circular, or other shapes. The angle α1 may be the same as angle α2. Alternatively, the angle α1 may be different than angle α2.

As illustrated in FIGS. 3 and 5, the coupling structures 154a and 154b are coupleably secured to the rear sill 142. In particular, the first beam portion 148 includes a pair of spaced apart front apertures 164a, 164b, and the second beam portion 150 also includes a pair of spaced apart rear apertures 166a, 166b. The coupling structure 154a is sized and shaped to be received in the front aperture 164a and the rear aperture 166a. Similarly, the coupling structure 154b is sized and shaped to be received in the front aperture 164b and the rear aperture 166b. The front apertures 164a, 164b and the rear apertures 166a, 166b together provide the coupling structures 154a, 154b access to the sill channel 152.

The coupling structures 154a, 154b are coupleably secured to the rear sill 142 via mounting plates 168a, 168b. Each of the mounting plates 168a, 168b includes a forward mounting plate 170a, 170b, and an aft mounting plate 172a, 172b. The coupling structure 154a is secured to the rear sill 142 via the mounting plate 168a. In particular, the coupling structure 154a is secured at the front aperture 164a and rear aperture 166a via the forward mounting plate 170a and the aft mounting plate 172a, respectively. Similarly, the coupling structure 154b is secured at the front aperture 164b and rear aperture 166b via the forward mounting plate 170b and the aft mounting plate 172b, respectively.

The coupling of the coupling structures 154a, 154b to the rear sill 142 via mounting plates 168a, 168b may comprise welding, fasteners, stamping, or any other coupling structures, to secure the coupling structures 154a, 154b to the rear sill 142 via mounting plates 168a, 168b.

Figure 7:
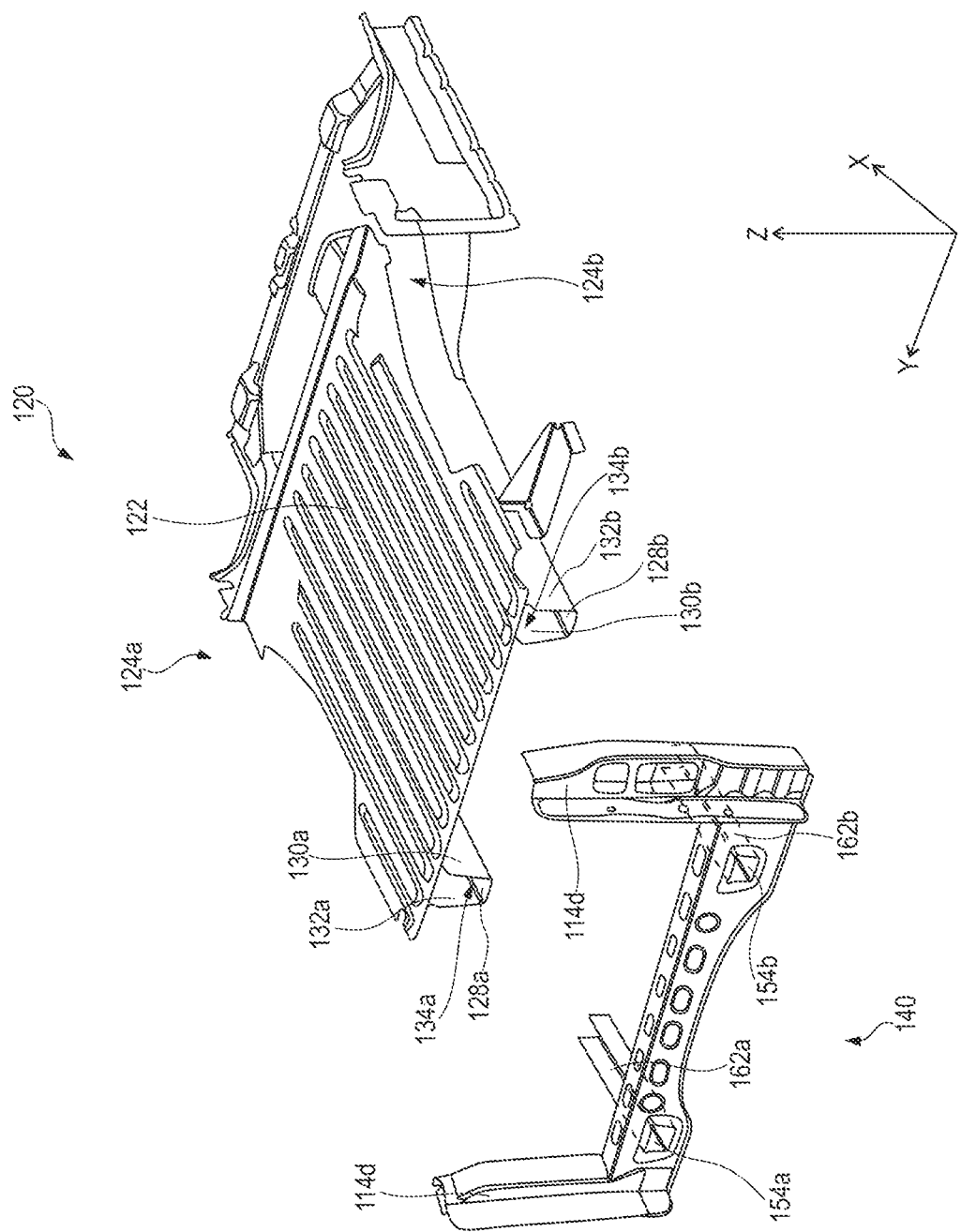
FIG. 7 is an exploded view of FIG. 2, illustrating a coupling of the rear sill assembly with the floor assembly.

FIG. 7 is an exploded view illustrating a coupling of the rear sill assembly 140 with the floor assembly 120. The rear sill assembly 140 is slideably coupled to the floor assembly 120 via the coupling structures 154a, 154b, which are slideably received in the floor channels 134a, 134b.

The coupling structures 154a, 154b extend outwardly beyond the second beam portion 150 of the rear sill assembly 140, along the X axis. As shown in detail in FIG. 7, the outer peripheries 162a, 162b of the coupling structures 154a, 154b are sized and shaped to be slideably received in the floor channels 134a, 134b, which are similarly sized and shaped to receive the coupling structures 154a, 154b.

In the illustrated example, the outer peripheries 162a, 162b are first aligned with respect to the floor channels 134a, 134b, along the X axis, and thereafter slide into the floor channels 134a, 134b, along the X axis. The coupling structures 154a, 154b are thereafter coupled to the floor beams 124a, 124b according to the various coupling structures described above.

Figure 8:
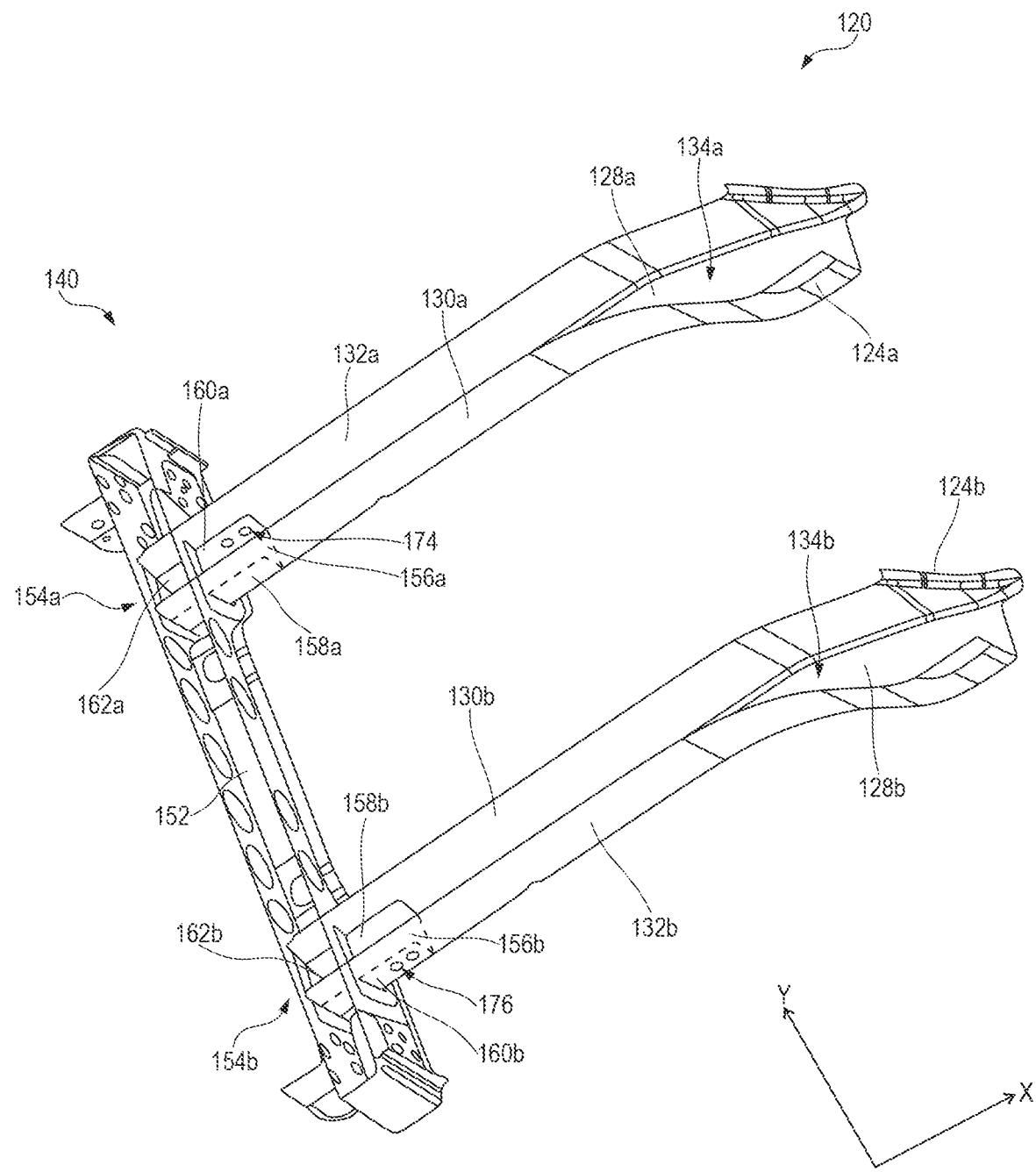
FIG. 8 is a breakaway perspective view of the rear sill assembly and the floor assembly of FIG. 2.

FIG. 8 is a breakaway perspective view of the rear sill assembly 140 and the floor assembly 120. As described above, and shown in FIG. 7, when the rear sill assembly 140 is slideably coupled to the floor assembly 120, surfaces of the outer peripheries 162a, 162b abut or mate with interior surfaces of the floor beams 124a, 124b. In particular, the base flange 156a, the first side flange 158a, and the second side flange 160a of the coupling structure 154a abut or mate with the first flange 128a, the second flange 130a, and the third flange 132a, respectively, of the floor beam 124a. Similarly, the base flange 156b, the first side flange 158b, and the second side flange 160b of the coupling structure 154b abut or mate with the first flange 128b, the second flange 130b, and the third flange 132b, respectively, of the floor beam 124b.

The base flanges 156a, 156b, the first side flanges 158a, 158b, and the second side flanges 160a, 160b include first coupling apertures 174. Further, the first flanges 128a, 128b, the second flanges 130a, 130b, and the third flanges 132a, 132b of the floor beams 124a, 124b may also include second coupling apertures 176. The first coupling apertures 174 of the coupling structures 154a, 154b are aligned with the second coupling apertures 176 of the floor beams 124a, 124b and are coupled together using fasteners such as bolts, rivets, or similar coupling structures.

Alternatively, the base flanges 156a, 156b, the first side flanges 158a, 158b, and the second side flanges 160a, 160b may be welded to the first flanges 128a, 128b, the second flanges 130a, 130b, and the third flanges 132a, 132b, respectively.

Moreover, the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A unibody truck, comprising:
a floor assembly having a floor pan and a floor beam positioned under the floor pan and coupled to the floor pan, the floor beam having a floor channel;
a rear sill; and
a coupling structure coupled to the rear sill, the coupling structure including an outer periphery which is sized and shaped to be slideably coupleably received in the floor channel.

2. The unibody truck of claim 1, further comprising:
a vehicle pillar that is coupled to a side of the rear sill.

3. The unibody truck of claim 1 wherein the outer periphery of the coupling structure is defined by a base flange, a first side flange extending outwardly from the base flange, and a second side flange extending outwardly from the base flange.

4. The unibody truck of claim 3 wherein the first side flange extends angularly with respect to a central axis of the coupling structure at a first angle and the second side flange extends angularly with respect to the central axis of the coupling structure at a second angle.

5. The unibody truck of claim 4 wherein the first angle and the second angle are different.

6. The unibody truck of claim 1, further comprising:
a mounting plate coupled to the coupling structure, the mounting plate sized and shaped to couple the coupling structure to the rear sill.

7. The unibody truck of claim 1 wherein the rear sill includes a first beam portion and a second beam portion, the first and second beam portions spaced apart to define a sill channel which is sized and shaped to receive the coupling structure.

8. The unibody truck of claim 7 wherein the coupling structure extends beyond the first and second beam portions.

9. The unibody truck of claim 1 wherein the coupling structure is coupled to the floor beam either via welds or fasteners.

10. A vehicle comprising:
a floor assembly having:
a floor pan;
a first floor beam positioned under the floor pan and coupled to the floor pan, the first floor beam having a first floor channel; and
a second floor beam positioned under the floor pan and coupled to the floor pan, the second floor beam having a second floor channel;
a rear sill;
a first coupling structure that is slideably coupleably received in the first floor channel; and
a second coupling structure that is slideably coupleably received in the second floor channel.

11. The vehicle of claim 10, further comprising:
a first pillar coupled to a first side of the rear sill; and
a second pillar coupled to a second side of the rear sill.

12. The vehicle of claim 10 wherein the first coupling structure includes a first outer periphery that is sized and shaped to be received in the first floor channel, and the second coupling structure includes a second outer periphery that is sized and shaped to be received in the second floor channel.

13. The vehicle of claim 12 wherein the first outer periphery of the first coupling structure is defined by a first base flange, a first side flange extending outwardly from the first base flange, and a second side flange extending outwardly from the first base flange, and further wherein the second outer periphery of the second coupling structure is defined by a second base flange, a third flange extending outwardly from the second base flange, and a fourth side flange extending outwardly from the second base flange.

14. The vehicle of claim 10, further comprising:
a first mounting plate coupled to the first coupling structure, the first mounting plate sized and shaped to couple the first coupling structure to the rear sill; and
a second mounting plate coupled to the second coupling structure, the second mounting plate sized and shaped to couple the second coupling structure to the rear sill.

15. The vehicle of claim 10 wherein the rear sill includes a first beam portion and a second beam portion, the first and second beam portions spaced apart to define a sill channel which is sized and shaped to receive the first coupling structure and the second coupling structure.

16. A rear sill assembly, comprising:
a first beam portion;
a second beam portion spaced apart longitudinally from the first beam portion to define a sill channel;
a first coupling structure that is received in the sill channel, the first coupling structure sized and shaped to slideably couple the rear sill assembly to a floor assembly; and
a second coupling structure that is received in the sill channel, the second coupling structure sized and shaped to slideably couple the rear sill assembly to the floor assembly.

17. The rear sill assembly of claim 16, further comprising:
a first forward mounting plate that is sized and shaped to couple the first coupling structure to the first beam portion;
a first aft mounting plate that is sized and shaped to couple the first coupling structure to the second beam portion;
a second forward mounting plate that is sized and shaped to couple the second coupling structure to the first beam portion; and
a second aft mounting plate that is sized and shaped to couple the second coupling structure to the second beam portion.

18. The rear sill assembly of claim 16, further comprising:
a first pillar coupled to a first side of the rear sill; and
a second pillar coupled to a second side of the rear sill.

19. The rear sill assembly of claim 16 wherein the first coupling structure includes a first base flange, a first side flange extending outwardly from the first base flange, and a second side flange extending outwardly from the first base flange.

20. The unibody truck of claim 1 wherein the floor beam tapers outwardly to form an actuate shape.

\* \* \* \* \*